(12) United States Patent
McKerracher et al.

(10) Patent No.: US 10,288,726 B2
(45) Date of Patent: May 14, 2019

(54) IMPULSE NOISE DETECTION AND REMOVAL FOR RADAR AND COMMUNICATION SYSTEMS

(71) Applicant: Raytheon Canada Limited, Ottawa (CA)

(72) Inventors: Richard McKerracher, Waterloo (CA); Anthony M. Ponsford, Ottawa (CA)

(73) Assignee: Raytheon Canada Limited, Ottawa (CA)

( * ) Notice: Subject to any disclaimer, the term of this patent is extended or adjusted under 35 U.S.C. 154(b) by 0 days.

(21) Appl. No.: 15/621,256

(22) Filed: Jun. 13, 2017

(65) Prior Publication Data

US 2017/0356988 A1 Dec. 14, 2017

Related U.S. Application Data

(60) Provisional application No. 62/349,798, filed on Jun. 14, 2016.

(51) Int. Cl.
| | |
|---|---|
| *G01S 13/02* | (2006.01) |
| *G01S 7/28* | (2006.01) |
| *G01S 7/292* | (2006.01) |
| *G01S 3/04* | (2006.01) |

(52) U.S. Cl.
CPC ........ *G01S 13/0209* (2013.01); *G01S 7/2813* (2013.01); *G01S 7/292* (2013.01); *G01S 3/043* (2013.01)

(58) Field of Classification Search
CPC .... G01S 13/0209; G01S 7/2813; G01S 7/292; G01S 3/043
See application file for complete search history.

(56) References Cited

U.S. PATENT DOCUMENTS

| | | | |
|---|---|---|---|
| 7,970,122 B2 * | 6/2011 | Chen ..................... | H04M 9/082 370/286 |
| 2001/0016041 A1 * | 8/2001 | Younce ................. | H04M 9/082 379/406.01 |
| 2006/0115077 A1 * | 6/2006 | Laberteaux ............. | H04B 3/23 379/406.01 |
| 2015/0078549 A1 * | 3/2015 | Frauenthal ............ | H04M 9/082 379/406.08 |

OTHER PUBLICATIONS

Lu et al., Impulsive Noise Excision and Performance Analysis, Jan. 2010, IEEE National Radar Conference Proceedings, pp. 1295-1300.*

(Continued)

*Primary Examiner* — Freshteh N Aghdam
(74) *Attorney, Agent, or Firm* — Daly, Crowley, Mofford & Durkee, LLP

(57) ABSTRACT

A radar system including a narrowband radar receiver configured to receive pulsed radar return signals and a wideband receiver configured for receiving wideband signals. A noise data processor is configured to identify impulse noises by analyzing wideband signals received by the wideband receiver and a radar processor is configured to cancel the identified impulse noises from pulse signals received by the radar receiver. The wideband impulse noises utilized to cancel noise from the pulse signals corresponds to the same time period sweep of detection as that of the pulse signals.

10 Claims, 9 Drawing Sheets

(56) References Cited

OTHER PUBLICATIONS

Lu, et al.; "Impulsive Noise Excision and Performance Analysis" IEEE National Radar Conference—Proceedinds; Jan. 2010; 7 Pages.
PCT Search Report & Written Opinion of the ISA dated Jul. 26, 2017 from International Application No. PCT/CA2017/050722; 7 Pages.
Singh; "Adaptive Noise Cancellation"; Department of Electronics & Communication; Netaji Subhas Institute of Technology; 1997; 52 Pages.
Varrall; "5G Spectrum and Standards"; Three-Band 5G: The Wavelength Bands; Artech House; May 31, 2016; p. 189; 1 Page.

\* cited by examiner

IMPULSE NOISE DETECTION AND REMOVAL FOR RADAR AND COMMUNICATION SYSTEMS

CROSS REFERENCE TO RELATED APPLICATIONS

The present invention claims priority to U.S. Provisional Application No. 62/349,798 filed on Jun. 14, 2016, the entire contents of which is herein incorporated by reference.

BACKGROUND

Interference can be a major impediment to the operational performance of radar systems. A common source of interference is impulsive noise which may appear due to regional lighting discharges or local man-made noise sources, for example. Impulsive noise is characterized as having a short duration and therefore only affects a small portion of a time series of pulses. However, for systems that integrate signals detected over a long period together, such a short duration of interference can result in elevated noise for an entire integration period. Traditional methods for mitigating signal degradation due to impulsive noise relies on the detection and removal of corrupted pulses and the use of various techniques to limit frequency leakage over the signal band. These techniques typically rely upon time domain envelope detection methods within the bandwidth of operation. For example, such a technique may involve analyzing the received envelope for a signal larger than expected in order to detect interference within the time segment.

However significant degradation may occur even with impulse events that do not significantly increase the envelop power of the received signal (see, e.g., FIG. 6A). The received signal may have significant energy from radar clutter and other sources, for example, and thus rendering these envelop detection techniques ineffective for lower amplitude events. Moreover, the effective signal to noise ratio may also be adversely affected by these low amplitude events.

For a high frequency radar operating with coherent integration times of a several minutes, for example, impulsive noise can corrupt significant portions of the received time sequence. In Doppler radar, data is converted from the time domain to the frequency domain by Fourier transformation. This has the effect of smearing the impulsive energy in the spectral domain thus decreasing the probability of target detection at all Doppler frequencies.

Detecting Impulses in the time domain is problematic and limits excision to larger spikes that are generally the result of local lightning storms. However, even small impulses can significantly elevate the apparent noise level and hence degrade the signal-to-noise level. Detection of these small impulses is best accomplished before narrow-band filtering.

Thus, improved methods of detecting and mitigating impulsive noise events are desired.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a system for performing pulsed radar with narrowband signals, identifying impulse noises with wideband data detection and analysis, and canceling the identified impulse noises from the narrowband radar signals.

In an aspect of embodiments, a radar system is provided including a narrowband radar receiver configured to receive pulsed radar return signals, a wideband receiver configured for receiving wideband signals, a noise data processor configured to identify impulse noises by analyzing wideband signals received by the wideband receiver, and a radar processor configured to cancel the identified impulse noises from pulse signals received by the radar receiver.

In an embodiment, the wideband receiver is configured to operate at a bandwidth of at least about five times the bandwidth of the narrowband receiver.

In an embodiment, identifying impulse noises comprises determining a wideband noise floor and detecting a raised wideband noise level above a threshold over the noise floor. In an embodiment, the threshold is at least about 5 dB.

In an embodiment, the impulse noises utilized to cancel noise from the pulse signals corresponds to the same time period sweep of detection as that of the pulse signals.

In an embodiment, the wideband impulse noises utilized to cancel noise from the pulse signals corresponds to a portion of the time period sweep during which radar return pulse signals are detected.

In an embodiment, the operating bandwidth of the wideband receiver is configured to be in the range of about 2 megahertz to about 30 megahertz.

In an embodiment, the operating bandwidth of the wideband receiver is configured to be in the range of about 3 megahertz to about 5.5 megahertz.

In an embodiment, the radar system further includes a radar processor configured to perform Doppler processing of the pulse signals from which noise is cancelled. In an embodiment, the radar processor is configured to perform at least one of L, S, or X band radar.

In an aspect of embodiments, a method for cancelling noise in a radar system is provided, the method including detecting radar return pulses with a receiver configured for receiving the return pulses, detecting wideband signals transmitted during the same time sweep as detected return pulses, identifying regions of impulse noise within the wideband signals that would corrupt the return pulses, and cancelling the identified impulse noise from the return pulses.

In an embodiment, the method includes cancelling the identified impulse noise from the return pulses comprises zeroing at least a portion of a return pulse identified as corrupted. In an embodiment, cancelling the identified impulse noise from the pulses comprises interpolating at least a portion of a return pulse identified as corrupted.

In an embodiment, interpolating includes at least one of linear block interpolation or polynomial interpolation.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. Furthermore, the drawings are not necessarily to scale, emphasis instead being placed on the concepts disclosed herein.

Figure 7A:
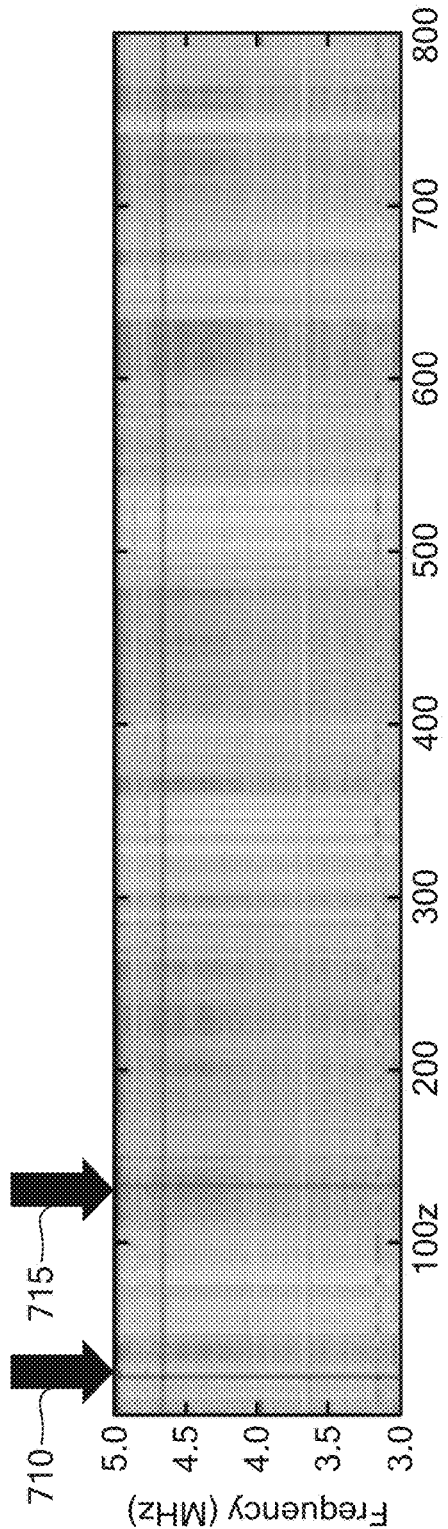
FIG. 7A is a plot of frequency energy compared to sweep index.
Figure 7B:
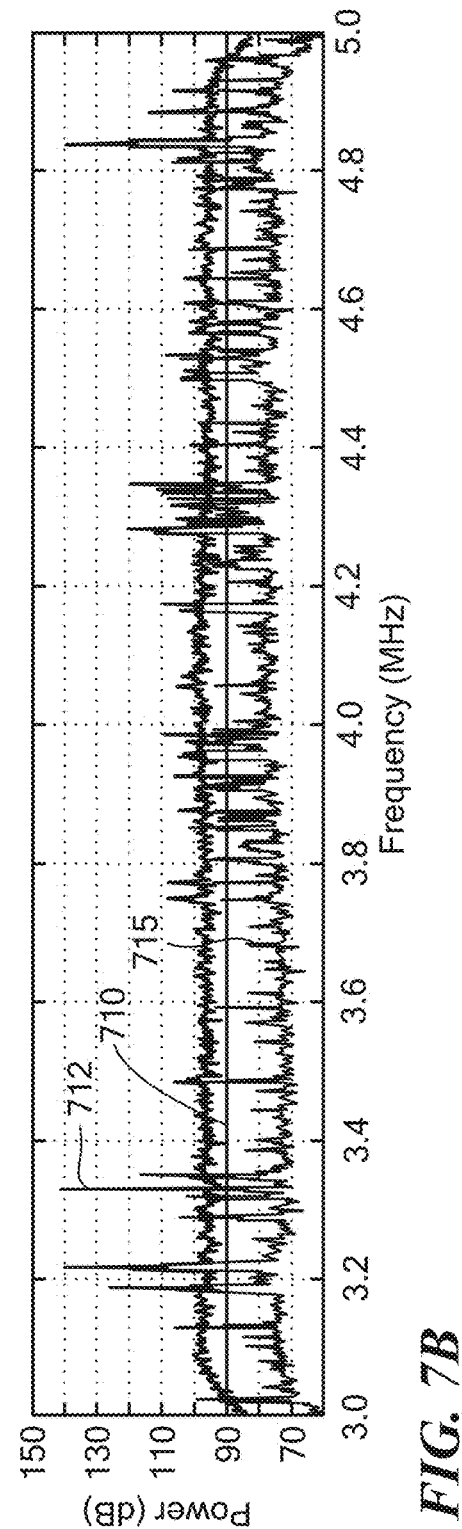

FIG. 7B includes two plots of power taken at sweep indexes of FIG. 7A.

Figure 8:
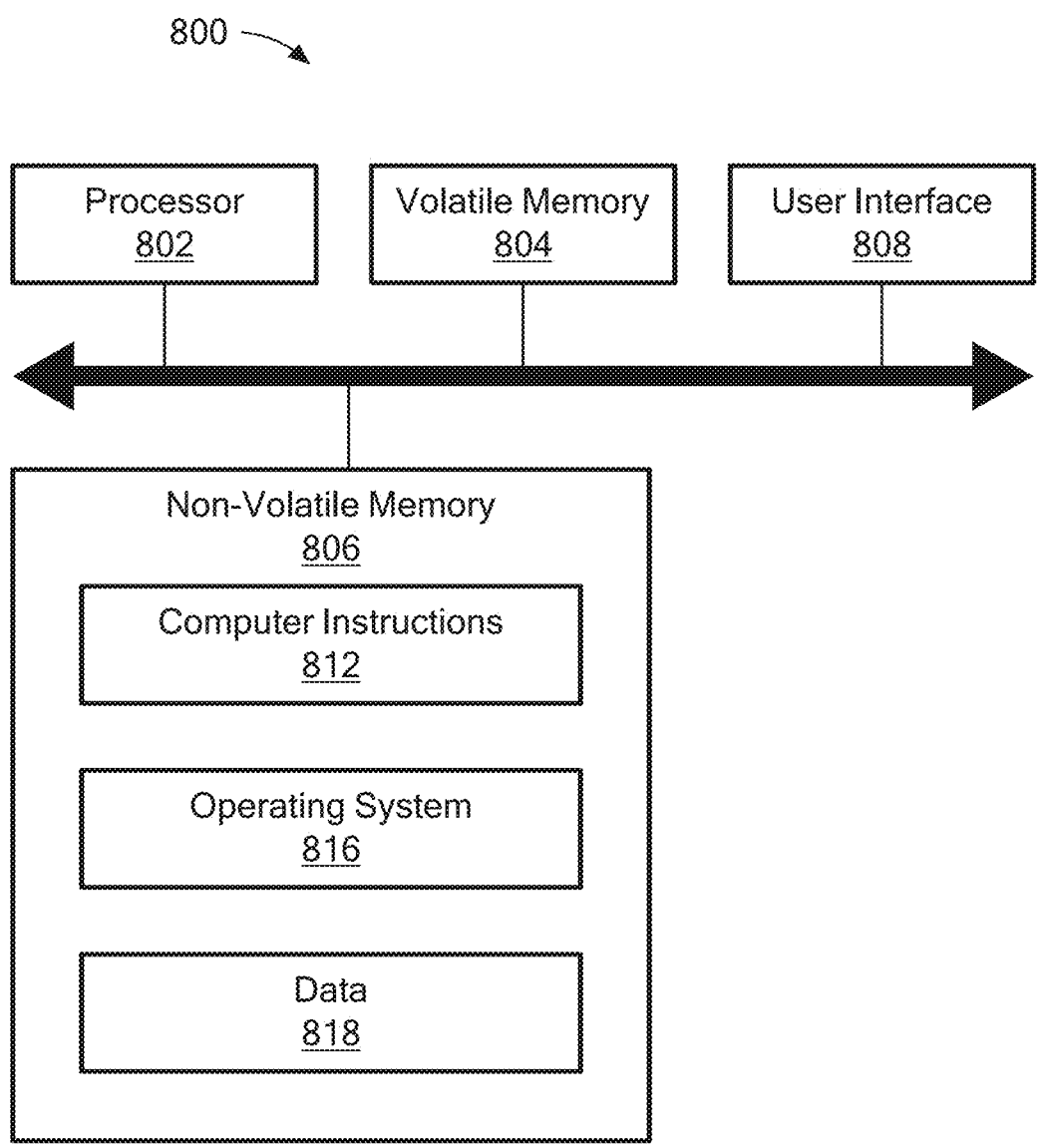

FIG. 8 is an illustrative block diagram of a computer system/controller for operating a radar system in accordance with described embodiments.

DETAILED DESCRIPTION

Described embodiments are directed to systems and methods for performing pulsed radar with narrowband signals, identifying impulse noises with wideband data detection and analysis, and canceling the identified impulse noises from the narrowband radar signals.

Figure 1:
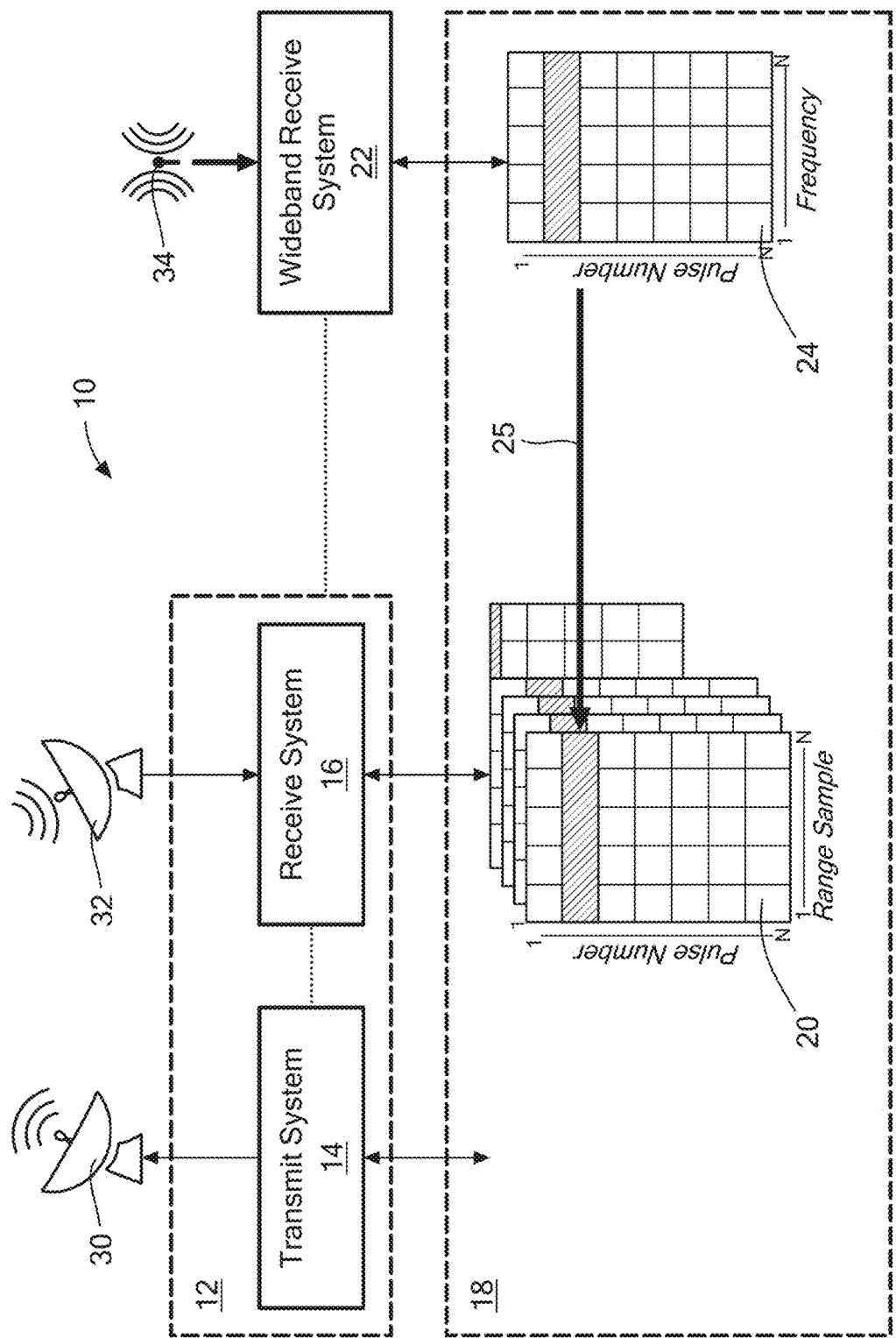
FIG. 1 is an illustrative block diagram of a radar and noise cancellation system according to described embodiments.

Referring to FIG. 1, a system 10 which combines wideband detection of impulse events and narrowband target detection to provide noise cancellation includes radar scanning system 12 having a radar transmission system 14 and a narrowband radar receiver system 16. Transmit and receive antennas 30, 32 are coupled to respective ones of the transmit and receive system 14, 16. In an embodiment, the transmit and receive antennas 30, 32 may be the same antenna as is generally known.

The radar scanning system 12 is controlled by a radar processor 18 which receives and stores radar data from radar sweeps using the receiver system 16. In an embodiment, transmit system 14 may be provided as a pulse Doppler transmit system and the raw radar data is narrowband radar data and thus receive system 16 may be provided as a narrowband receiver 16. In an embodiment, transmit and receive systems 14, 16 and associated antennas 30, 32 may be provided as a conventional pulse Doppler system. In embodiments, other types of radar systems can be used such as, for example, frequency-modulated continuous-wave (FMCW) radar.

A wideband data receiver system 22 having a wideband antenna 34 coupled thereto is also controlled by radar processor 18 and is operated in coordination with the radar transmit and receive systems 14, 16 to receive wideband signal data concurrently with narrowband radar data being received via antenna 32 and receiver 16. In an embodiment, wideband data may correspond to a block of frequencies in the range of, for example, 2 megahertz (MHz) to 30 MHz. In an embodiment, wideband data may correspond to a block of frequencies in the range of, for example, 3 MHz to 5.5 MHz or the range of 3 MHz to 4 MHz. In embodiments, the described techniques can be applied in L, S and X Band Radar (e.g., 1-12 GHz) and can be combined with techniques including multiple pulses with defined detection intervals. In an embodiment, the wideband receiver 22 receives signals which fall within a frequency bandwidth which may, for example be about five times the frequency bandwidth over which the narrowband receiver receives signals.

It should, of course, be appreciated that system 10 may operate over any of numerous other frequency ranges selected for use in accordance with the needs of a particular application. The particular frequency bandwidths receive systems 16, 22 operate may be selected in accordance with a variety of factors including but not limited to the expected environment, type of noise, and frequency of radar data utilized. After reading the disclosure provided herein, one of ordinary skill in the art will appreciate how to select a frequency range which meets the needs of a particular application. In described embodiments, the narrowband wavelength range, the range of signal frequencies within which the radar functions operate, can be determined by the requirements of the system and on the environment in which the radar system operates. For example, resolution, range, available frequencies, and needed performance in clutter can be used to select the narrowband range. In embodiments, a wideband range can be selected which is known to be substantially and generally impacted by typical noise impulse events (e.g., lightning strikes) that will also impact the selected narrowband range.

In embodiments, in which narrowband ranges are selected dynamically such as based on environmental conditions or available frequencies, the wideband range can be selected based on "slots" in which the narrowband frequencies can potentially operate. In other embodiments, the wideband range is also dynamically selected once the narrowband range is selected dynamically. In yet other embodiments, the wideband range is first selected dynamically based on, for example, environmental conditions and available frequencies and the narrowband frequency is subsequently selected. In an embodiment, the wideband system can change wideband signal range based upon mission objectives and equipment limitations.

In this context, narrowband is defined by the bandwidth of the radar signal which is selected to meet the primary requirements of the radar. For example, range resolution and clutter rejection performance can be related to radar bandwidth, whereas larger bandwidth can equate to higher range resolution and typically better target detection in clutter. Equipment limitations as well as regulatory issues may limit the maximum bandwidth a radar system could use.

Wideband receivers and processing systems are used to monitor the potential frequency range over which the radar may operate within. In an embodiment, the wide band system may identify the "slots" the narrow band system could operate within. For high frequency radars, typical narrowband values are a band of about 20 to 50 KHz, with a frequency range of about 3 to 5 MHZ.

Wideband receivers and processing systems are used to monitor the potential frequency range over which the radar may operate within. In an embodiment, the wide band system may identify the "slots" the narrow band system could operate within. For high frequency radars, typical narrowband values are a band of about 20 to 50 KHz, with a frequency range of about 3 to 5 MHZ. For example, in an embodiment, the wideband system could identify an open slot at 3.335 MHz, which the narrowband system would tune to and operate within a 40 KHZ band centered at this frequency. The extent of the frequency range over which the wideband system may operate can be defined by mission parameters as well as equipment limitations.

In an embodiment, the radar processor 18 processes the wideband signal data by identifying elevated noise floors in the wideband data (see, e.g., elevated noise floor 710 of exemplary wideband data in FIG. 7). Because the wideband and narrowband data is synchronized in time, radar pulses received from the receiver system 16 during the time period of the elevated wideband noise floor, noise from those pulses can be canceled or reduced from the narrowband data. Because the wideband and narrowband data are synchronized in time, the specific pulse(s) that is (are) corrupted by the impulse event can be identified. There are several techniques known to those of ordinary skill in the art to eliminate the effect of the corrupted narrowband pulse. One method is to replace the corrupted pulse data by a zero energy pulse. Thus, the energy from the extraneous impulse event is eliminated. Other techniques include attenuation of the corrupted pulse, or various interpolation methods. Because an impulse event is external and thus affects all portions of the band, the wideband and narrowband signals are synchronized in time.

In an embodiment, the pulse of a narrowband radar range sample 20 is correlated (as illustrated by an exemplary link 25) to wideband data 24 by pulse number. In an embodiment, noise cancellation is based upon an interpretation of the wideband noise floor in comparison with the narrowband data. In an embodiment, the entire corrupted noise pulse is canceled which can include "zeroing" the corrupted noise pulse data. In an embodiment, only a portion of the corrupted pulse corresponding to the timing of an impulse noise event is canceled. In embodiments, methods of cancelling noise from corrupted data include interpolation and attenuation techniques known to those of ordinary skill in the art. In embodiments, only the portion of the corrupted pulse need be eliminated. In some embodiments, this may be difficult as extra processing would need to be performed to identify the time extent of the corruption within a pulse, and thus the entire pulse is dealt with such as described herein. In this way, corrupted pulse data detected by the wideband receiver can be removed from the radar data 20 and/or modified.

Figure 2:
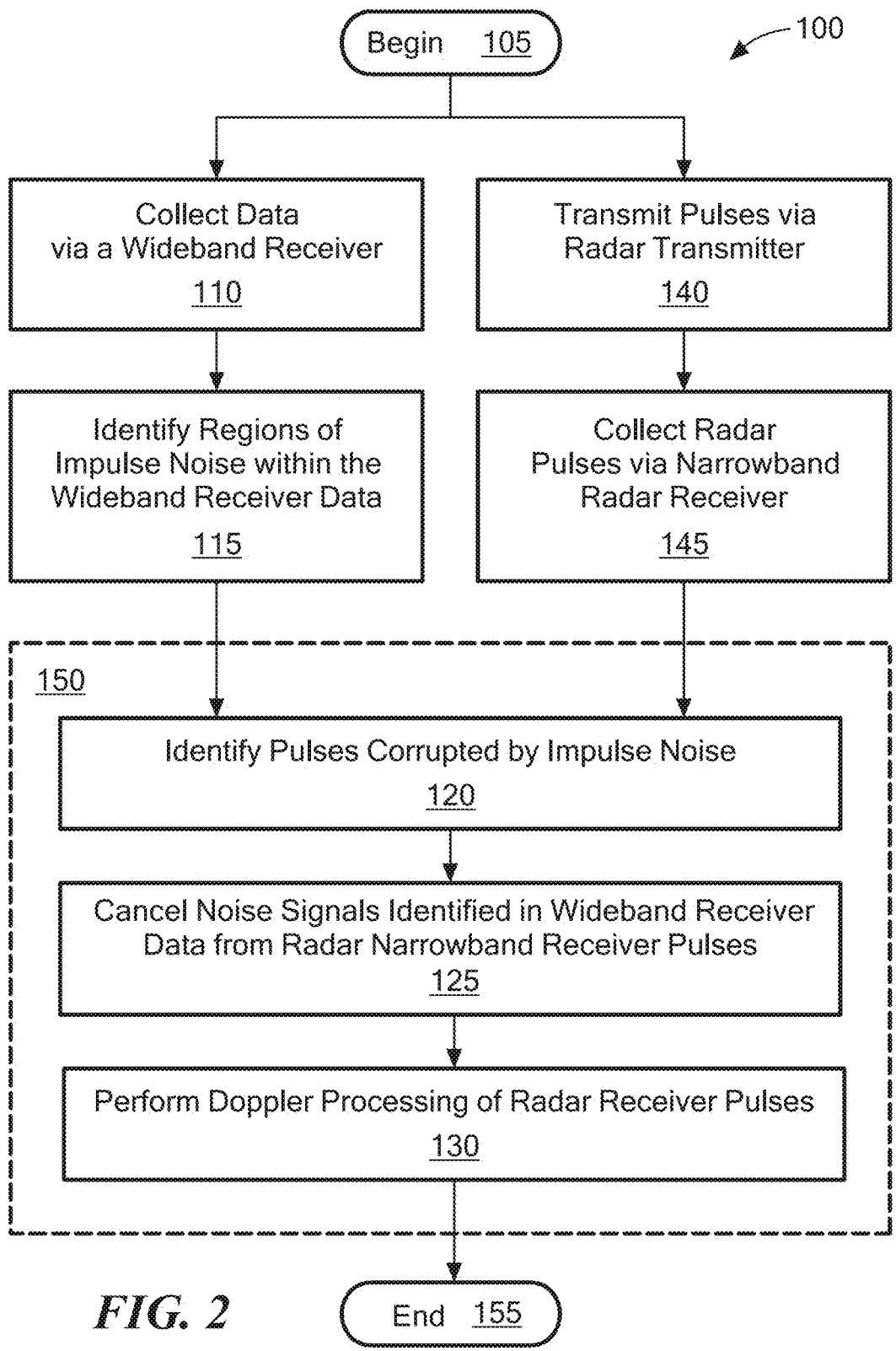
FIG. 2 is a process flow diagram of the operation of a radar and noise cancellation system according to described embodiments.

Referring to FIG. 2, a process flow diagram of the operation of a radar and noise cancellation system according to described embodiments such as the system described above in conjunction with FIG. 1 is shown. An exemplary process 100 begins at block 105, after which narrowband radar functions begin at block 140 (e.g., executed by the radar scanning system 12 of FIG. 1) while wideband signal collection begins at block 110 (e.g., executed by the wideband data receiver system 22). At block 140, a radar transmitter transmits radar pulses, after which a radar receiver collects returned radar pulses at block 145 in response to the transmitted radar pulses. During a time period corresponding to the period when narrowband radar data is collected, wideband data collection occurs through a wideband receiver at block 110. The wideband data is correlated (e.g., synchronized or time aligned) in the time domain with narrowband data that is collected in a radar noise data processor (e.g., in radar processor 18). The particular timing of narrowband and wideband data collection is described below in conjunction with FIG. 4. Suffice it here to say that the wideband and narrowband data collection operations are coordinated to allow removal of undesirable data from the narrowband radar data.

As shown in block 115, after collection, the wideband data is analyzed to identify elevated noise levels such as, for example, described above with reference to radar processor 18, after which returned radar pulses corresponding to the wideband data with elevated noise are identified at block 120. Cancellation of noise from radar data collected via a narrowband radar receiver is then performed at block 125. In an embodiment, after noise cancellation occurs at block 125 on the narrowband radar signals, the radar signals undergo Doppler processing at block 130 such as by radar processor 18 and can then be utilized according to Doppler processed radar data as is known to one of ordinary skill in the art. Processing blocks 120-130 thus represent a noise cancellation process 150. (i.e. the radar pulse data from processing block 145 and the identified regions of impulse noise within the wideband receiver data are provided to noise cancellation process 150.

The process of radar and wideband signal collection and processing can then end at block 155. Above-described processing of blocks 110-113 can then be repeated. In embodiments, the post-data collection processes (e.g., noise cancellation, Doppler processing) can occur during or after additional radar and wideband data is collected.

Figure 3:
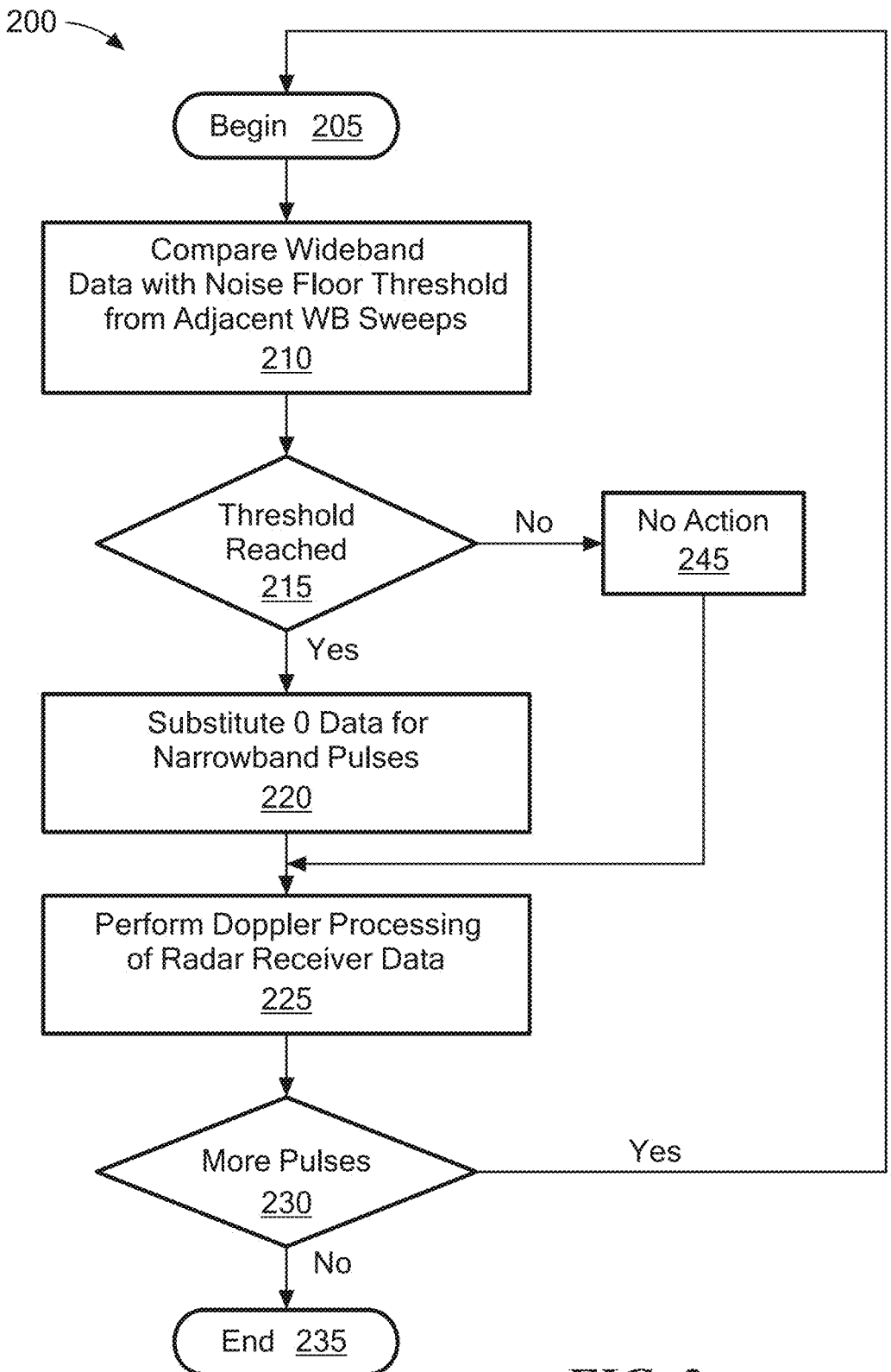
FIG. 3 is a flow diagram of a noise cancellation process according to described embodiments.

Referring to FIG. 3, a flow diagram of one particular exemplary noise cancellation process 200, which may be the same as or similar to process 150 (FIG. 2), according to described embodiments begins at block 205. In an embodiment, a noise floor threshold is defined based on wideband data collected during a typical sequence of sweeps (e.g., an average or median level of noise from multiple sweeps). In an embodiment, the threshold can be a predefined offset from the average or typical noise level expected. In embodiments, the threshold can be adapted depending on observed environmental conditions (e.g., more frequent or longer noise events) and the desired sensitivity to such events). There is no hard and fast rule for defining an offset. In embodiments, this can depend on the nature and frequency of the impulse events. In embodiments, infrequent events may allow for a lower threshold, thus greater sensitivity. More frequent or longer events can allow for a higher threshold to minimize false alarms. In embodiments, a threshold level is generally chosen to allow for reliable detection of the elevated noise floor.

At block 210, an analysis of collected wideband data for a particular sweep is performed and compared to the noise floor threshold. If the threshold is exceeded at block 215, then noise cancellation is performed at block 220 (e.g., such as substituting corresponding narrowband pulses with zeroed data or other techniques as identified herein) prior to Doppler processing at block 225. In an embodiment, if the noise threshold is not reached at block 215, no noise cancellation occurs at block 245, and the process proceeds to Doppler processing at block 225.

At block 230, if more radar pulses are to be processed after Doppler processing of the radar data, the noise cancellation process repeats for additional pulses at block 205. Once all pulses have been processed for noise cancellation, the noise cancellation process completes at block 235. In an embodiment, blocks 225 and 230 can be swapped in order to accommodate processing of a predetermined time period of pulses (e.g., such as a coherent integration time (CIT) as known to those of ordinary skill in the art) prior to Doppler processing. In an embodiment, when a sufficient number of pulses has been collected, Doppler processing proceeds at block 225 prior to collection of the next time period of pulses.

Figure 4:
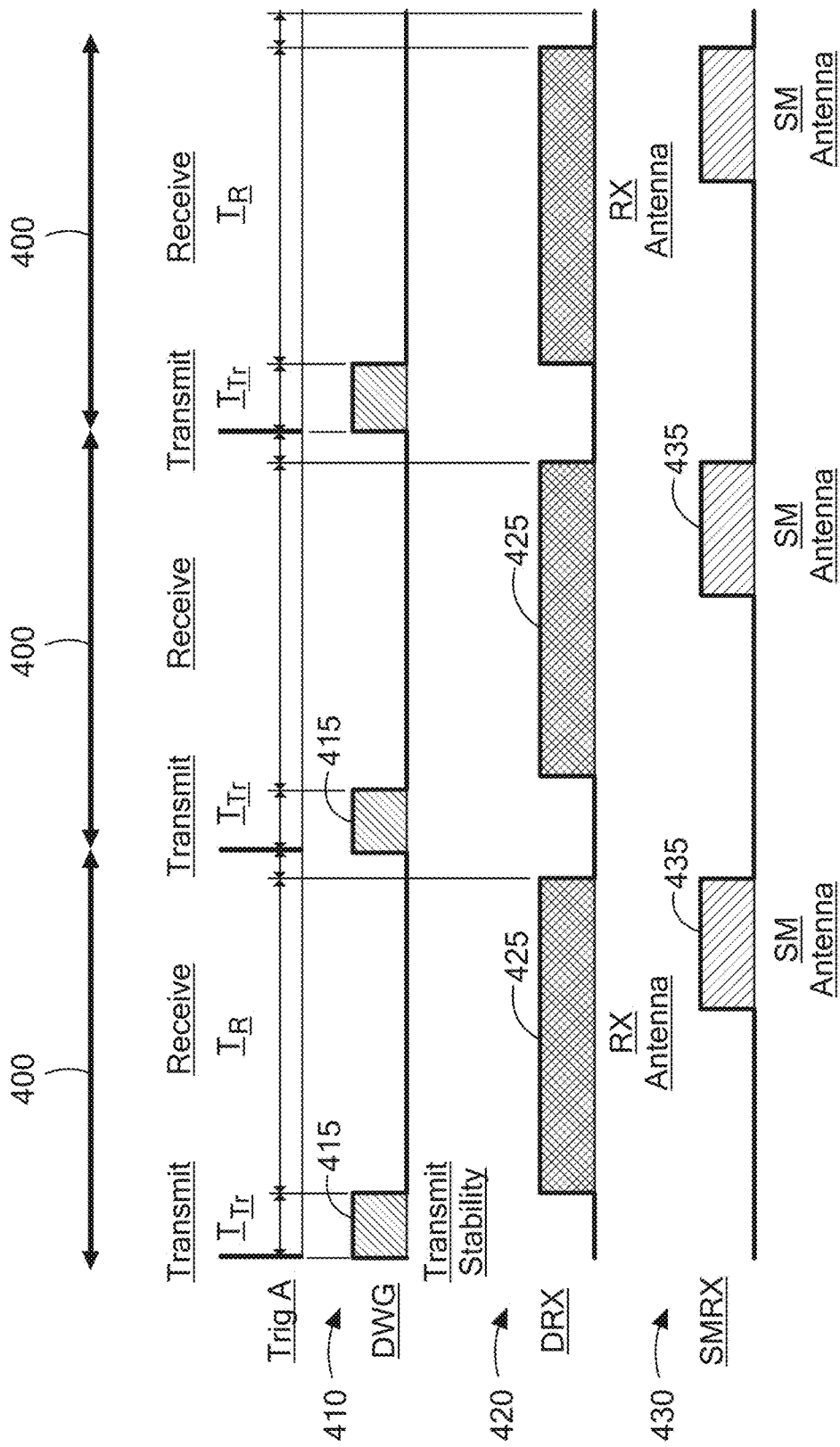
FIG. 4 is an illustrative timing diagram of radar waveform generation and receiving according to described embodiments.

Referring to FIG. 4, an illustrative timing diagram of radar waveform generation and receiving is shown according to described embodiments. The diagram represents three radar time periods 400, each having a Transmit ($T_{Tr}$) portion (or segment), a Receive ($T_R$) portion (or segment), and a data modification portion (or segment) ($T_{Mod}$). A timeline 410 (DWG) represents the timing of radar narrowband waveform generation, a timeline 420 (DRX) represents the timing of operation of a narrowband receiver, and a timeline 430 (SMRX) represents the timing of operation of a wideband receiver according to embodiments. During the Transmit segment $T_{Tr}$, radar narrowband waveform generation and transmission occurs during segment 415 after which, during the Receive segment $T_R$, radar return data is collected during segment 425. In an embodiment, wideband signal data is also collected during a segment 435 which represents at least a portion of the Receive ($T_R$) segment.

In other embodiments, in a system operating in the band frequency range of between about 3-5 MHz for about 200 nautical miles of coverage, a radar transmitter transmits a 500 microsecond (μsec) pulse during the Transmit ($T_{Tr}$) portion and a narrowband receiver "listens" for a period of time corresponding to about 4000 μsec. A wideband receiver operates within a portion of the 4000 μsec time period. Ideally, the wideband receiver operates toward or at the end of the 4000 μsec time period (e.g. the Tmod segment) since it is preferable to delay operation of the wideband receiver as long as possible. It should, of course, be appreciated that it is also possible to perform the wideband receiver operation at any portion of the time period (e.g. at any portion of the 4000 μsec time period) including at or near the beginning of the time period.

Figure 5:
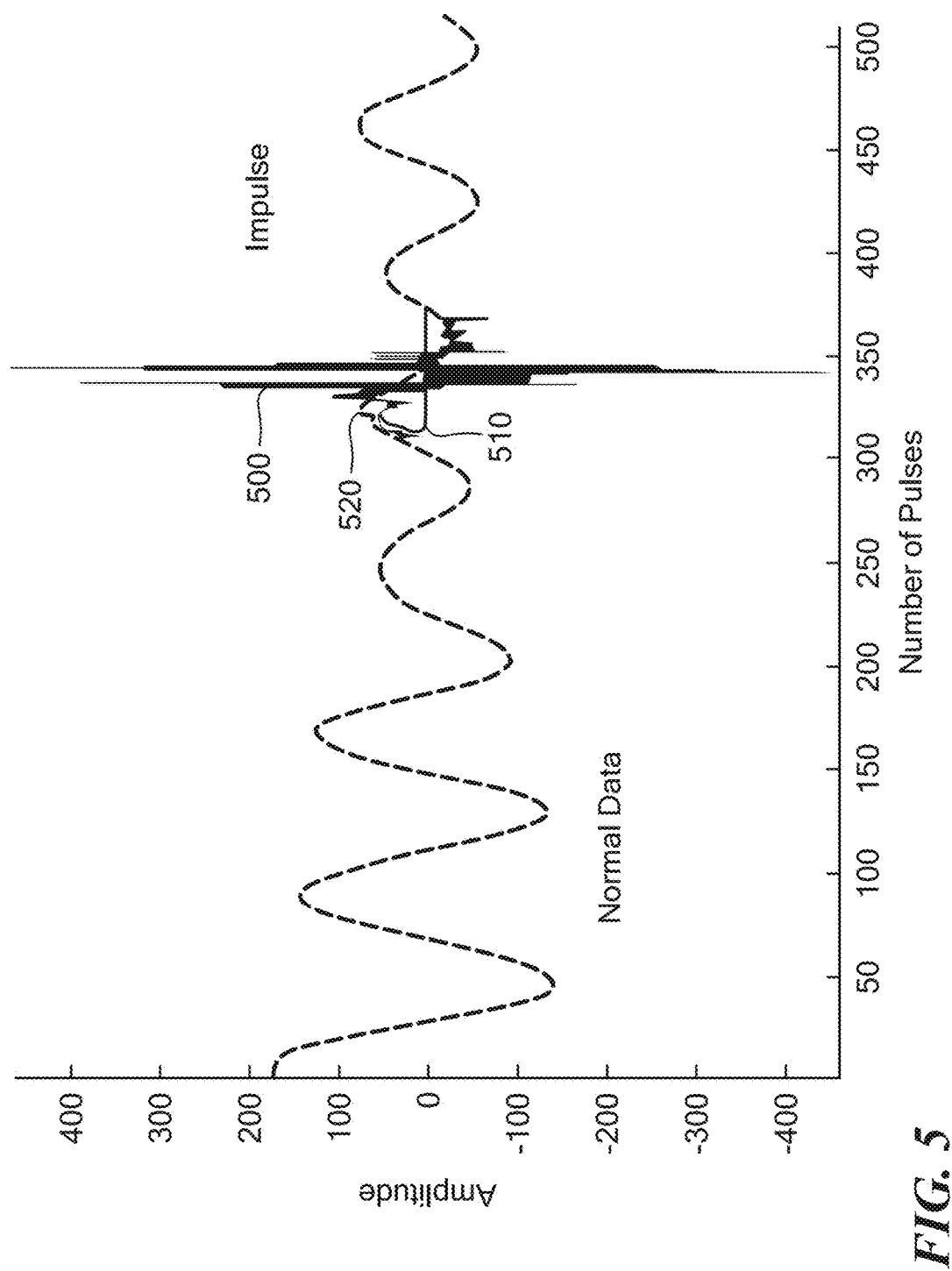
FIG. 5 is a plot of impulse radar data showing an exemplary noise spike and plots of noise correction applied to the radar data.

Referring to FIG. 5, a plot of impulse radar data showing an exemplary noise spike and plots of noise correction applied to the radar data is shown. At around pulse 350, a significant impulse noise spike 500 occurs, dramatically distorting the expected return radar signal. Such a spike can typically be identified by comparing the expected return radar signal with recorded noise levels that greatly exceed the expected signal. A radar system according to embodiments may correct such a spike by either zeroing/blanking the corrupted data with zeroed data 510 or by replacing the corrupted data with interpolated data 520 using various types of interpolation methods known to those of skill in the art. In an embodiment, the interpolation is based upon a block linear prediction including simple linear interpolation between the beginning and end of a corrupted segment or higher order interpolation methods can be used such as polynomial based interpolation. However, when an impulse noise spike occurs that is smaller in magnitude than the expected magnitude of the return radar signal envelope, identification can be significantly more difficult.

Figure 6A:
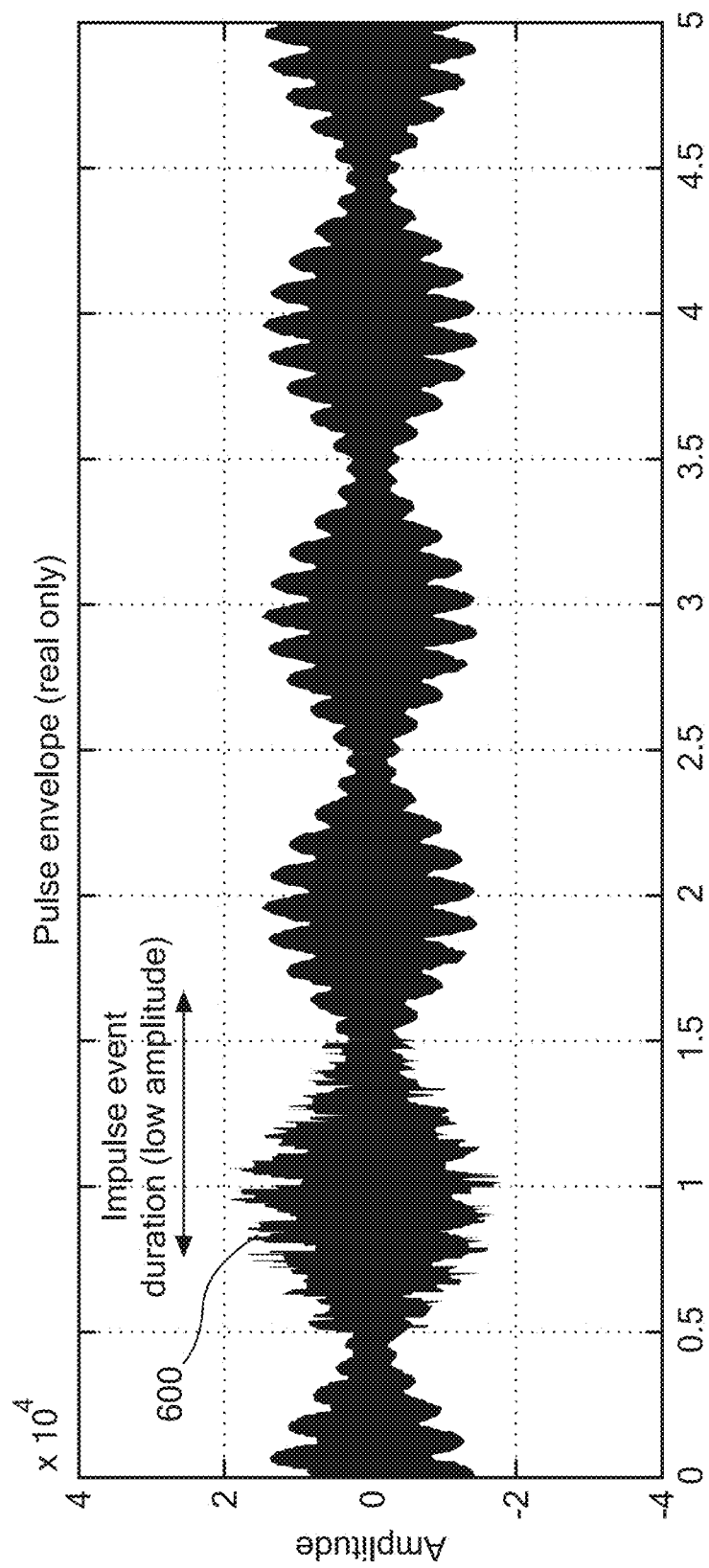
FIG. 6A is an illustrative plot of a radar pulse envelope affected by a noise event.
Figure 6B:
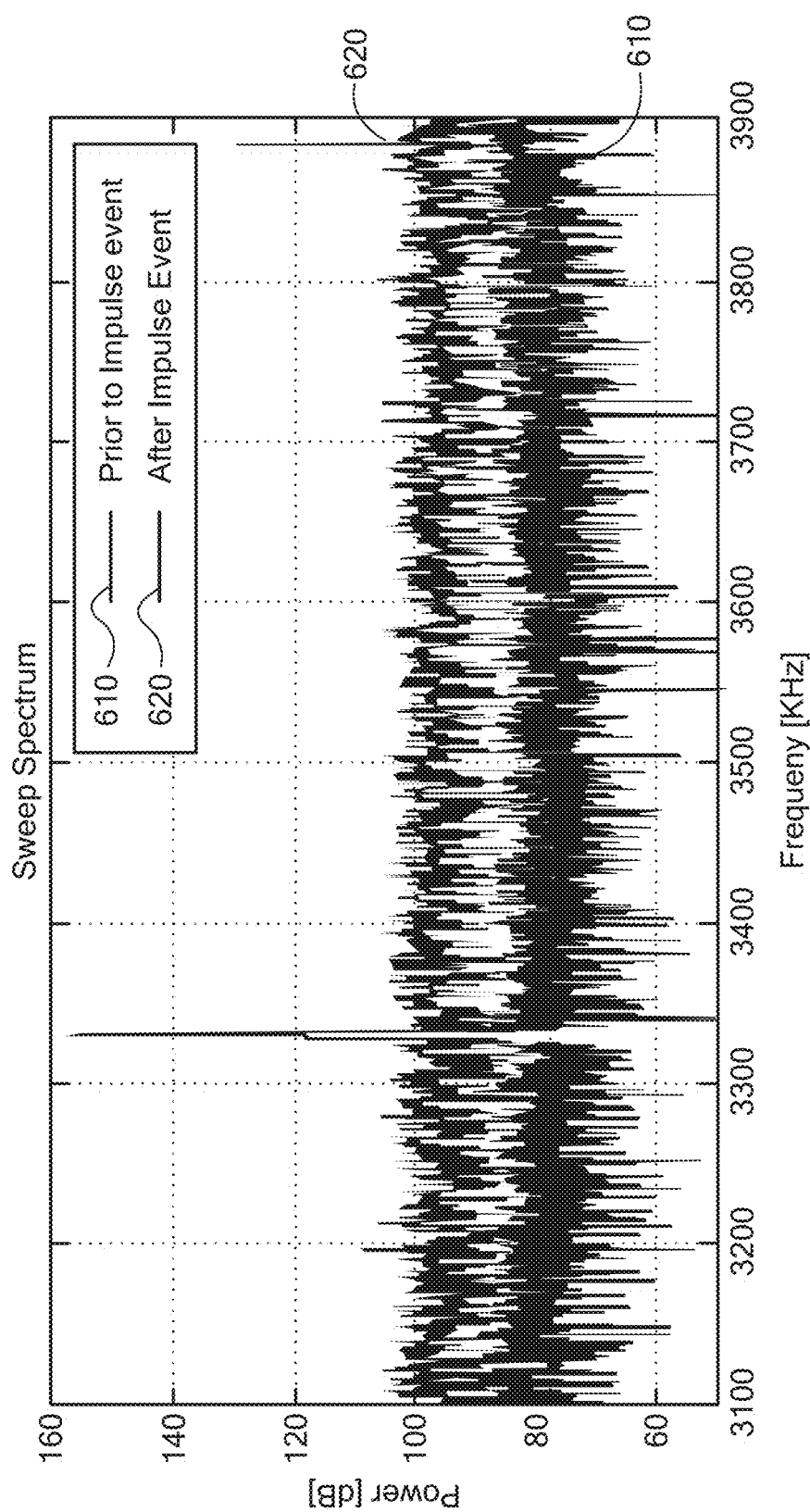
FIG. 6B is a plot in the frequency domain of collected wideband data before and after the occurrence of the noise event shown in FIG. 6A.

Referring to FIG. 6A, an illustrative plot of a radar pulse (narrowband) envelope 600 affected by a noise event is shown. Referring to FIG. 6B, a plot in the frequency domain of collected wideband data (between 3100 and 3900 KHz) before and during the noise impulse event of FIG. 6A is shown. FIG. 6A shows noise interference (within the pulse of between 0.5 and 1.5 seconds) that does not impact the signal to nearly the extent of the noise shown in FIG. 5 and thus is more difficult to detect if utilizing traditional threshold comparisons with the narrowband signals only. FIG. 6B, however, shows a distinctive difference between the approximate median (about 75 dB) of signal data 610 collected before an impulse noise event and approximate median noise levels (about 95 dB) of signal data 620 collected during an impulse event. In an embodiment, this distinction is utilized such as described herein to identify and correct corrupted radar pulse data using wideband data.

Referring to FIGS. 7A and 7B, FIG. 7A is a plot of frequency energy compared to sweep index and FIG. 7B includes two plots 710,715 of power taken at sweep indexes at 710, 715 in FIG. 7A. The index at 710 is a cross section of higher (noisier) noise levels versus a lower (less noisy) energy wideband sweep at 715 as shown. As can be seen in FIG. 7B, a sweep at 710 represents a relatively higher median noise floor while a sweep at 715 represents a relatively lower median energy profile across a relatively wide range of frequencies (e.g. across frequencies between about 3 and 5 MHz). A median noise floor threshold 712 is established in order to identify sweeps in which an elevated median noise level of a sweep will trigger noise cancellation or reduction processes as described in various embodiments. In described embodiments, the median noise level threshold is established based upon prior monitoring of wideband data and sensitivity levels desired during operation of the noise cancelling radar system.

Referring to FIG. 8, an illustrative block diagram is provided of a computer system/controller for operating a radar system, such as the processor/controller 18 shown in FIG. 1, in accordance with described embodiments. A computer 800 includes a processor 802, a volatile memory 804, a non-volatile memory 806 (e.g., hard disk) and a user interface (UI) 808 (e.g., a graphical user interface, a mouse, a keyboard, a display, touch screen and so forth). The non-volatile memory 806 stores computer instructions 812, an operating system 816 and data 818. In one example, the computer instructions 812 are executed by the processor 802 out of volatile memory 804 to perform all or part of the processes described herein (e.g., processes illustrated in FIGS. 2 and 3).

The processes described herein (e.g., processes described in reference to FIGS. 1, 2, and 3) are not limited to use with particular hardware and software; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. In embodiments, the processor can include ASIC, FPGA, and/or other types of circuits. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes of FIGS. 2 and 3 are not limited to the specific processing order illustrated. Rather, any of the processing blocks of FIGS. 2 and 3 may be re-ordered, combined or removed, performed in parallel or in serial, as necessary, to achieve the results set forth above.

The processing blocks (for example, of FIGS. 2 and 3) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing the embodiments and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts that have been described and illustrated herein might be made by those skilled in the art without departing from the scope of the following claims.

I claim:

1. A radar system, comprising:
a narrowband radar receiver configured to receive pulsed radar return signals;
a wideband receiver configured for receiving wideband signals;
a noise data processor configured to identify impulse noises by analyzing wideband signals received by the wideband receiver; and
a radar processor configured to cancel the identified impulse noises from the pulsed radar return signals received by the narrowband radar receiver.

2. The radar system of claim 1 wherein the wideband receiver is configured to operate at a bandwidth of at least five times the bandwidth of the narrowband receiver.

3. The radar system of claim 1 wherein identifying impulse noises comprises determining a wideband noise floor and detecting a raised wideband noise level above a threshold over the noise floor.

4. The radar system of claim 3 wherein the threshold is at least 5 dB.

5. The radar system of claim 1 wherein the impulse noises utilized to cancel noise from the pulse signals corresponds to the same time period sweep of detection as that of the pulse signals.

6. The radar system of claim 1 wherein the wideband impulse noises utilized to cancel noise from the pulse signals corresponds to a portion of the time period sweep during which the radar return pulsed signals are detected.

7. The radar system of claim 1 wherein the operating bandwidth of the wideband receiver is configured to be in the range of 2 megahertz to 30 megahertz.

8. The radar system of claim 7 wherein the operating bandwidth of the wideband receiver is configured to be in the range of 3 megahertz to 5.5 megahertz.

9. The radar system of claim 1 further comprising a radar processor configured to perform Doppler processing of the pulsed radar return signals from which noise is cancelled.

10. The radar system of claim 9 wherein the radar processor is configured to perform at least one of L, S, or X band radar.

* * * * *